UNITED STATES PATENT OFFICE.

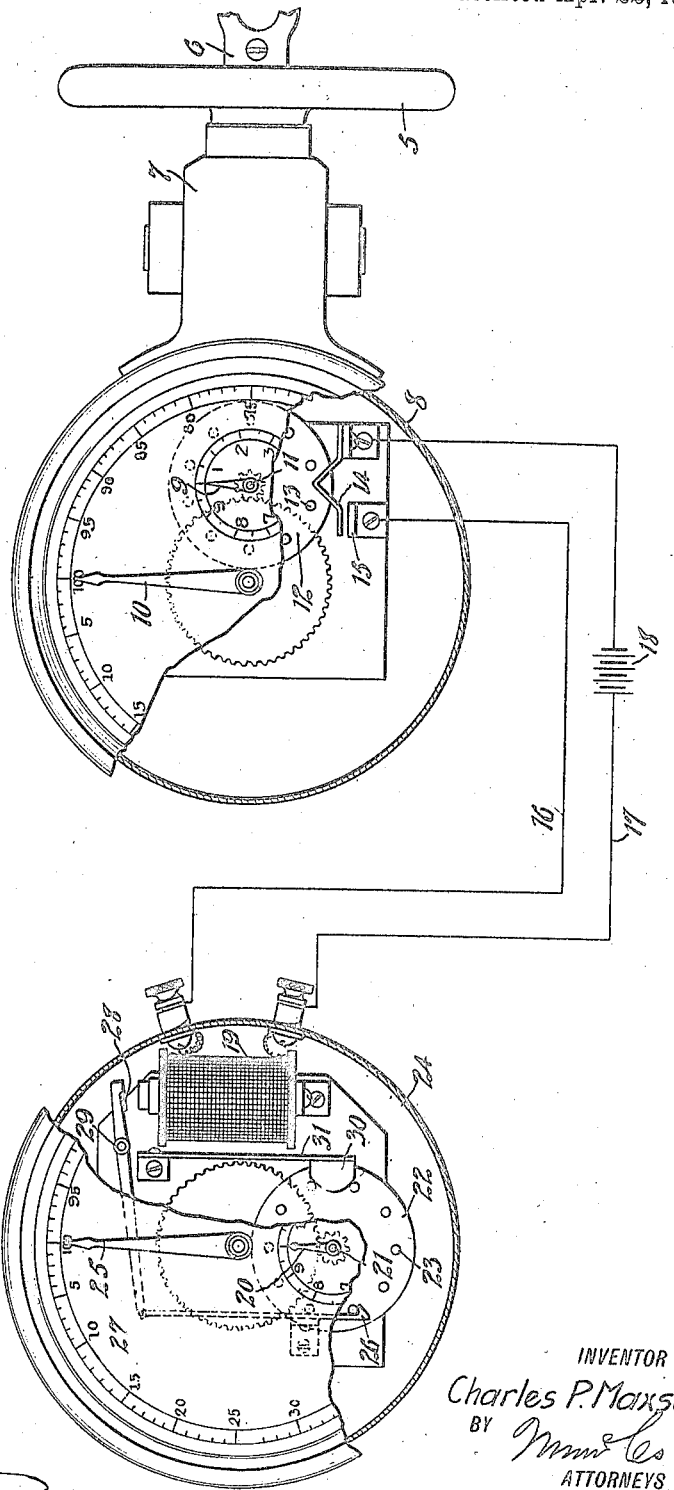

CHARLES P. MAXSON, OF WEST MYSTIC, CONNECTICUT.

SHIP'S LOG.

1,301,585.  Specification of Letters Patent. Patented Apr. 22, 1919.

Application filed April 3, 1918. Serial No. 226,462.

*To all whom it may concern:*

Be it known that I, CHARLES P. MAXSON, a citizen of the United States, and a resident of West Mystic, in the county of New London and State of Connecticut, have invented a new and Improved Ship's Log, of which the following is a full, clear, and exact description.

Among the principal objects which the present invention has in view are: to provide means for repeating at the navigating officer's station, the indication of the taffrail instrument of a ship's log; to provide means for continuously showing to the navigating officer of a ship the trailing log indications, and to simplify the construction of the mechanism necessary to accomplish the above-stated objects.

*Drawings.*

The figure shown in the drawings is a schematic view of the taffrail instrument for recording the operation of a trailing log, and a duplicating instrument operatively connected therewith for repeating the record of the taffrail instrument.

*Description.*

As seen in the drawings, the taffrail instrument is provided with a flywheel 5, which is mounted rigidly on a shaft 6, which in service is connected with the log line, at the trailing end whereof is a whirling drag. The shaft 6 has suitable bearings in a housing 7, at the opposite end whereof is structurally connected a casing 8. Within the casing 8 is a gear train, which is operatively connected with the shaft 6 for rotating pointers 9 and 10 in correspondence with the rotation of said shaft and the trailing member above referred to. The taffrail instrument is of conventional construction, and the gear train therein is arranged to move the pointers 9 and 10 to indicate the movement of the trailing instrument through the water, the indications being translated into nautical miles and divisions thereof.

In the present invention, the shaft 11 on which the pointer 9 is mounted, carries an additional disk 12. The disk 12 is suitably provided with pins 13, which pins are spaced apart in correspondence with the calibrating divisions indicating on the dial over which the pointer 9 travels. The purpose of the pins 13 is to deflect the electric spring switch terminal 14, and to cause the same to engage the electric terminal block 15. The switch terminal and block are embodied in an electric circuit incorporating the lead wires 16 and 17, an electric source, such as a battery 18, and an electromagnet 19.

When the electric circuit is completed by the engagement of the terminal 14 with the block 15, the electromagnet 19 is energized. This action transpires in correspondence with the movement of the pointer 9, and has for its immediate object to move the pointer 20 on the repeating instrument which is mounted in the pilot-house or at the navigating station of a ship.

The repeating instrument referred to is in the major part, the same construction as the indicating taffrail instrument. In the repeating instrument, however, the connection provided in the taffrail instrument for engagement with the shaft 6, is, of course, omitted. Also the electromagnetically-operated apparatus shown in the repeating instrument is not common to the taffrail instrument, but the pointer 20, shaft 21, disk 22, and pins 23 are substantially duplicates of the pointer 9, shaft 11, disk 12, and pins 13.

The repeating instrument is provided with a casing 24 and a pointer 25, which casing and pointer correspond with the pointer 10 and casing 8 of the taffrail instrument. In the repeating instrument, the pins 23 are operatively engaged by a hook 26 suspended from and pivotally connected with the long arm of a lever 27. The lever 27 has at the end of the short arm thereof, an armature 28 normally disposed in the magnetic field of the electromagnet 19. The lever 27 is pivotally mounted on a shaft 29, and is rocked thereon to lift the long arm of said lever and hook 26 connected therewith whenever the magnet 19 is energized by the closing of the switch terminal 14 on the terminal block 15. The movement of the disk 22 by the hook 26 corresponds with the movement of the disk 12 by the operating mechanism connecting the same with the shaft 6. To prevent the disk 22 from movement too freely and to hold the same in set position, a brake blade 30 is provided to strike between and engage adjacent pins 23. The blade 30 is suspended at the end of a yielding spring 31.

When a ship is provided with a log constructed and arranged as described, the operation is as follows: The taffrail instrument having been placed in service continues to operate during the run of the ship, the shaft 6 whirling in correspondence with the trailing log. The taffrail instrument by means of the pointers 9 and 10 thereof, indicates the distance of travel. The disk 12 is rotated in correspondence with the pointer 9 and the pins 13 successively engage and depress the switch terminal 14, causing the same to close the electric circuit wherein is incorporated the electromagnet 19. The electromagnet 19 when energized rocks the lever 27 having the long arm, to lift the hook 26, so that the disk 22 is rotated thereby a distance corresponding with the travel of the pointer 9 in the taffrail instrument.

As the repeating instrument is mounted in the pilot-house or navigating station of the ship, the navigating officer has constantly in view the indicator showing the distance traveled in a known period of time. It is obvious that the connection between the shafts carrying the pointers 9 and 10 and the connection between the shafts carrying the pointers 20 and 25, are substantially the same in the two instruments so that the pointer 25 in the repeating instrument operates in the same relation to the pointer 20, as the pointer 10 in the taffrail instrument bears to the pointer 9 in said taffrail instrument.

Claim.

A ship's log comprising a whirling controlling member; a rotary index operatively connected with said member; a rotary member operatively connected with said index for making and breaking an electric circuit in correspondence with the operation of said index, said rotary member having a disk embodying a series of outwardly-extending pins, an electric circuit embodying a resilient switch member, a source of electric power, a magnet, and wires for completing the circuit when said switch member is closed; a second rotary index for operating in correspondence with the first-mentioned rotary index, said second rotary index having a pointer for indicating on the face of said index; a driving mechanism for said pointer, said driving mechanism incorporating said magnet, a rocking lever, a disk having a series of pins extending from the face thereof, and a swinging hook operatively connected with said rocking lever, and adapted to engage successively the pins in said disk for moving said disk and parts connected therewith including said pointer.

CHARLES P. MAXSON.